(12) United States Patent
Quan

(10) Patent No.: US 8,330,997 B2
(45) Date of Patent: Dec. 11, 2012

(54) IMAGE PROCESSING APPARATUS, IMAGE FORMING APPARATUS AND IMAGE PROCESSING METHOD

(75) Inventor: Do Quan, Ho Chi Minh (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 12/512,170

(22) Filed: Jul. 30, 2009

(65) Prior Publication Data

US 2010/0085611 A1   Apr. 8, 2010

(30) Foreign Application Priority Data

Oct. 2, 2008 (KR) ............... 10-2008-0097112
Dec. 2, 2008 (KR) ............... 10-2008-0121307

(51) Int. Cl.
*H04N 1/04* (2006.01)
(52) U.S. Cl. ......... 358/474; 358/475; 358/487; 358/506
(58) Field of Classification Search .............. 358/474, 358/475, 487, 506, 509
See application file for complete search history.

(56) References Cited

U.S. PATENT DOCUMENTS

| | | | | |
|---|---|---|---|---|
| 5,453,818 A | * | 9/1995 | Maehara et al. | 399/14 |
| 5,463,217 A | * | 10/1995 | Sobol et al. | 250/234 |
| 7,471,424 B2 | * | 12/2008 | Ishido et al. | 358/449 |
| 2003/0038984 A1 | * | 2/2003 | Ohkawa | 358/462 |
| 2004/0165223 A1 | | 8/2004 | Ishido et al. | |
| 2005/0052681 A1 | * | 3/2005 | Kogi | 358/1.14 |

FOREIGN PATENT DOCUMENTS

JP   2001-157018   6/2001

* cited by examiner

*Primary Examiner* — Houshang Safaipour
(74) *Attorney, Agent, or Firm* — Stanzione & Kim, LLP

(57) ABSTRACT

An image processing method, and an image processing apparatus with which to perform the method, the method including generating a scan image by scanning an object, detecting a non-image area affected by external incident light in the scan image according to a pixel-value distribution pattern varied depending on incident angles of the external incident light, and extracting an image area corresponding to the object by removing the non-image area from the scan image.

33 Claims, 12 Drawing Sheets

IMAGE PROCESSING APPARATUS, IMAGE FORMING APPARATUS AND IMAGE PROCESSING METHOD

CROSS-REFERENCE TO RELATED APPLICATIONS

This application claims the benefit under 35 U.S.C. §119 (a) of Korean Patent Applications No. 10-2008-0097112, filed on Oct. 2, 2008, and No. 10-2008-0121307, filed on Dec. 2, 2008, in the Korean Intellectual Property Office, the disclosures of which are incorporated herein by reference in their entirety.

BACKGROUND

1. Field of the Invention

Apparatuses and methods consistent with the present general inventive concept relate to an image processing apparatus, an image forming apparatus, and an image processing method of reading a scan image of an object, and more particularly, an image processing apparatus, an image forming apparatus, and an image processing method which detects a boundary of an object when reading a scan image of the object.

2. Description of the Related Art

An image processing apparatus reads an image from an object and processes the read image. These operations can be achieved by, for example, a scanner.

In the image processing apparatus, an object is seated on a transparent and flat plate, and a scan image of the object is read by a scanning unit that moves under the flat plate. The image processing apparatus is connected to a host, such as a computer or the like, and transmits the read scan image to the host.

Since the scanning unit projects a light beam upon an object to read the scan image of the object, the image processing apparatus includes a cover to cover the transparent and flat plate and the object and prevent a light beam from coming through.

However, while scanning an object, there may be cases in which the object is so thick, such as a thick book, that it is difficult to cover the object with the cover, or the cover is being opened for a user's convenience, such as while scanning many pages of a book. In this case, the image processing apparatus is affected by external incident light, and therefore an image scanned by the scanning unit contains an image area corresponding to the object and a non-image area due to the external incident light.

A conventional image processing apparatus determines and processes the non-image area of the scan image as part of the image area, resulting in the scan image being processed with distortion of a real boundary of the object. Accordingly, if such a non-image area is removed from the scan image, the real boundary may be obtained without distortion, thereby deriving a proper image area of the object from an initial scan image.

SUMMARY

The present general inventive concept provides an image processing apparatus, an image forming apparatus, and an image processing method which can remove a non-image area caused by external incident light from an image scanned by a scanning unit, thereby obtaining a real boundary of an image area corresponding to an object.

The foregoing and/or other aspects and utilities of the present general inventive concept can be achieved by providing an image processing method of an image processing apparatus, the method including generating a scan image by scanning an object detecting a non-image area affected by external incident light from the scan image according to a pixel-value distribution pattern varied depending on incident angles of the external incident light in response to the external incident light being present while scanning the object, and extracting an image area corresponding to the object by removing the non-image area from the scan image.

The method may further include detecting edge pixels of the scan image according to a gray level pattern of pixels in the scan image, wherein the extracting the image area corresponding to the object includes dividing the scan image into a plurality of areas with respect to distribution of the detected edge pixels to remove the non-image area.

The detecting the non-image area may include determining the non-image area affected by the external incident light according to the pixel-value distribution patterns formed by the external incident light at incident angles of 90 degrees and less than 90 degrees, respectively.

The determining the non-image area affected by the external incident light may include determining that a scan area is formed by the external incident light at the incident angle of 90 degrees in response to the scan area having repetitive patterns along a column in which pixel values of plural pixels in a row section of the scan area transitioning from substantially black to white, have a successive white section and transition from white to a darker pixel value.

The determining the non-image area affected by the external incident light may include determining that a scan area is formed by the external incident light at the incident angle less than 90 degrees in response to the scan area of the scan image having hue dispersion equal to or higher than a first predetermined value and no detected edge pixels or the number of edge pixels being smaller than or equal to a second predetermined value.

The extracting the image area corresponding to the object may include: designating a boundary candidate according to a distribution pattern of the edge pixels; and defining a boundary of the image area by determining the non-image area among divided areas of the scan image divided by the boundary candidate.

The non-image area may include a first non-image area formed regardless of the external incident light and the object, and a second non-image area formed by the external incident light, and the defining the boundary of the image area may include selectively removing or maintaining the divided areas by determining whether each of the divided areas is the first non-image area or the second non-image area.

The selectively removing or maintaining the divided areas may include: determining whether occupation of black pixels in each of the divided areas is equal to or higher than a first predetermined value; and determining whether each of the divided areas has a pixel-value distribution pattern due to the external incident light incident at an angle of 90 degrees or less than 90 degrees according to results of the determining of the occupation of black pixels.

The selectively removing or maintaining the divided areas may include: determining whether the number of edge pixels is equal to or larger than a second predetermined value in response to there being a pixel-value distribution pattern affected by the external incident light; and maintaining any of the divided areas in which the number of edge pixels is equal to or larger than the second predetermined value, and removing any of the divided areas in which the number of edge pixels is smaller than the second predetermined value.

The determining whether each of the divided areas has the pixel-value distribution pattern due to the external incident light may include: determining the pixel-value distribution pattern to be due to the external incident light incident at an angle of 90 degrees in response to the occupation of black pixels being equal to or higher than the first predetermined value; and determining the pixel-value distribution pattern to be due to the external incident light incident at an angle less than 90 degrees in response to the occupation of black pixels being less than the first predetermined value.

The detecting the edge pixels of the scan image may include determining that pixels among the plural pixels in the scan image are the edge pixels in response to a gray level difference between respective ones of the pixels and an adjacent pixel being equal to or higher than a predetermined value.

The foregoing and/or other aspects and utilities of the present general inventive concept may also be achieved by providing an image processing apparatus including a scanning unit which generates a scan image by scanning an object, and an image processing unit which detects a non-image area affected by external incident light from the scan image according to a pixel-value distribution pattern varied depending on incident angles of the external incident light in response to the external incident light being present while scanning the object, and extracts an image area corresponding to the object by removing the non-image area from the scan image.

The image processing unit may detect edge pixels of the scan image according to a gray level pattern of pixels in the scan image, and dividing the scan image into a plurality of areas with respect to distribution of the detected edge pixels to remove the non-image area.

The image processing unit may determine the non-image area affected by the external incident light according to the pixel-value distribution patterns formed by the external incident light at incident angles of 90 degrees and less than 90 degrees, respectively.

The image processing unit may determine that a scan area is formed by the external incident light at the incident angle of 90 degrees in response to the scan area having repetitive patterns along a column in which pixel values of plural pixels in a row section of the scan area transition from substantially black to white, have a successive white section and transition from white to a darker pixel value.

The image processing unit may determine that a scan area is formed by the external incident light at the incident angle less than 90 degrees in response to the scan area of the scan image having hue dispersion equal to or higher than a first predetermined value and no detected edge pixels or the number of edge pixels being smaller than or equal to a second predetermined value.

The image processing unit may designate a boundary candidate according to a distribution pattern of the edge pixels; and define a boundary of the image area by determining the non-image area among areas of the scan image divided by the boundary candidate.

The non-image area may include a first non-image area formed regardless of the external incident light and the object, and a second non-image area formed by the external incident light, and the image processing unit may selectively remove or maintain the divided areas by determining whether each of the divided areas is the first non-image area or the second non-image area.

The image processing unit may determine whether occupation of black pixels in each of the divided areas is equal to or higher than a first predetermined value; and may determine whether each of the divided areas has a pixel-value distribution pattern due to the external incident light incident at an angle of 90 degrees or less than 90 degrees according to results of the determining of the occupation of black pixels.

The image processing unit may determine whether the number of edge pixels is equal to or larger than a second predetermined value in response to there being a pixel-value distribution pattern affected by the external incident light; and maintain any of the divided areas in which the number of edge pixels is equal to or larger than the second predetermined value, and remove any of the divided areas in which the number of edge pixels is smaller than the second predetermined value.

The image processing unit may determine the pixel-value distribution pattern to be due to the external incident light incident at an angle of 90 degrees in response to the occupation of black pixels being equal to or higher than the first predetermined value; and may determine the pixel-value distribution pattern to be due to the external incident light incident at an angle less than 90 degrees in response to the occupation of black pixels being less than the first predetermined value.

The image processing unit may determine that pixels among the plural pixels in the scan image are the edge pixels in response to a gray level difference between respective ones of the pixels and an adjacent pixel being equal to or higher than a predetermined value.

The foregoing and/or other aspects and utilities of the present general inventive concept may also be achieved by providing an image forming apparatus including the foregoing discussed image processing apparatus, and a printing unit which prints the image area corresponding to the object and received from the image processing apparatus on a print medium.

The foregoing and/or other aspects and utilities of the present general inventive concept may also be achieved by providing an image processing method of an image processing apparatus, the method including generating a scan image by scanning an object, detecting a scan area formed differently according to an incident angle of external light while scanning the object, from the scan image, and processing the scan image according to results of the detecting the scan area.

The detecting the scan area may include determining the scan area affected by the external incident light according to pixel-value distribution patterns formed by the external incident light at incident angles of 90 degrees and less than 90 degrees, respectively.

The determining the scan area affected by the external incident light may include determining that the scan area is formed by the external incident light at the incident angle of 90 degrees in response to the scan area having repetitive patterns along a column in which pixel values of plural pixels in a row section of the scan image transition from substantially black to white, have a successive white section and transition from white a darker pixel value.

The method may further include detecting edge pixels of the scan image according to a gray level pattern of pixels in the output scan image.

The determining the scan area affected by the external incident light may include determining that the scan area is formed by the external incident light at the incident angle less than 90 degrees in response to the scan area of the scan image having hue dispersion equal to or higher than a first predetermined and no detected edge pixels or the number of edge pixels being smaller than or equal to a second predetermined value.

The detecting the edge pixels of the scan image may include determining that pixels among the plural pixels in the scan image are the edge pixels in response to a gray level difference between respective ones of the pixels and an adjacent pixel being equal to or higher than a predetermined value.

The processing the scan image may include: dividing the scan image into a plurality of areas with respect to distribution of the detected edge pixels; and extracting an image area corresponding to the object by removing the scan area affected by the external incident light among the divided areas.

The scan area may include a first non-image area formed regardless of the external incident light and the object, and a second non-image area formed by the external incident light, and the processing the scan image may include: dividing the scan image into a plurality of areas with respect to distribution of the detected edge pixels; and selectively removing or maintaining each of the divided areas by determining whether each of the divided areas is the first non-image area or the second non-image area.

The selectively removing or maintaining each of the divided areas may include: determining whether occupation of black pixels in each of the divided areas is equal to or higher than a first predetermined value; and determining whether each of the divided areas has a pixel-value distribution pattern due to the external incident light incident at an angle of 90 degrees or less than 90 degrees according to results of the determining of the occupation of black pixels.

The selectively removing or maintaining each of the divided areas may include: determining whether the number of edge pixels is equal to or larger than a second predetermined value in response to there being a pixel-value distribution pattern affected by the external incident light; and maintaining any of the divided areas in which the number of edge pixels is equal to or larger than the second predetermined value, and removing any of the divided areas in which the number of edge pixels is smaller than the second predetermined value.

The determining whether each of the divided areas has the pixel-value distribution pattern due to the external incident light may include: determining the pixel-value distribution pattern to be due to the external incident light incident at an angle of 90 degrees in response to the occupation of black pixels being equal to or higher than the first predetermined value; and determining the pixel-value distribution pattern to be due to the external incident light incident at an angle less than 90 degrees in response to the occupation of black pixels being less than the first predetermined value.

The foregoing and/or other aspects and utilities of the present general inventive concept may also be achieved by providing an image processing apparatus including a scanning unit to generate a scan image by scanning an object, and an image processing unit to detect a scan area formed differently according to an incident angle of external light while scanning the object, from the scan image, and to process the scan image according to the detected scan area.

The foregoing and/or other aspects and utilities of the present general inventive concept may also be achieved by providing a computer readable medium having recorded thereon a program to perform an image processing method of an image processing apparatus, the method including generating a scan image by scanning an object, detecting a scan area formed differently according to an incident angle of external light while scanning the object, from the scan image, and processing the scan image according to results of the detecting the scan area.

The foregoing and/or other aspects and utilities of the present general inventive concept may also be achieved by providing an image processing apparatus including a scanning unit to scan an object using light to generate an image, and an image processing unit to detect a non-image area in the image according to different characteristics from a characteristic of an image area of the image to generate a signal representing the image area.

The non-image area may include a first non-image area formed by the light and a second non-image area formed by a different light.

Additional aspects and utilities of the present general inventive concept will be set forth in part in the description which follows and, in part, will be obvious from the description, or may be learned by practice of the general inventive concept.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
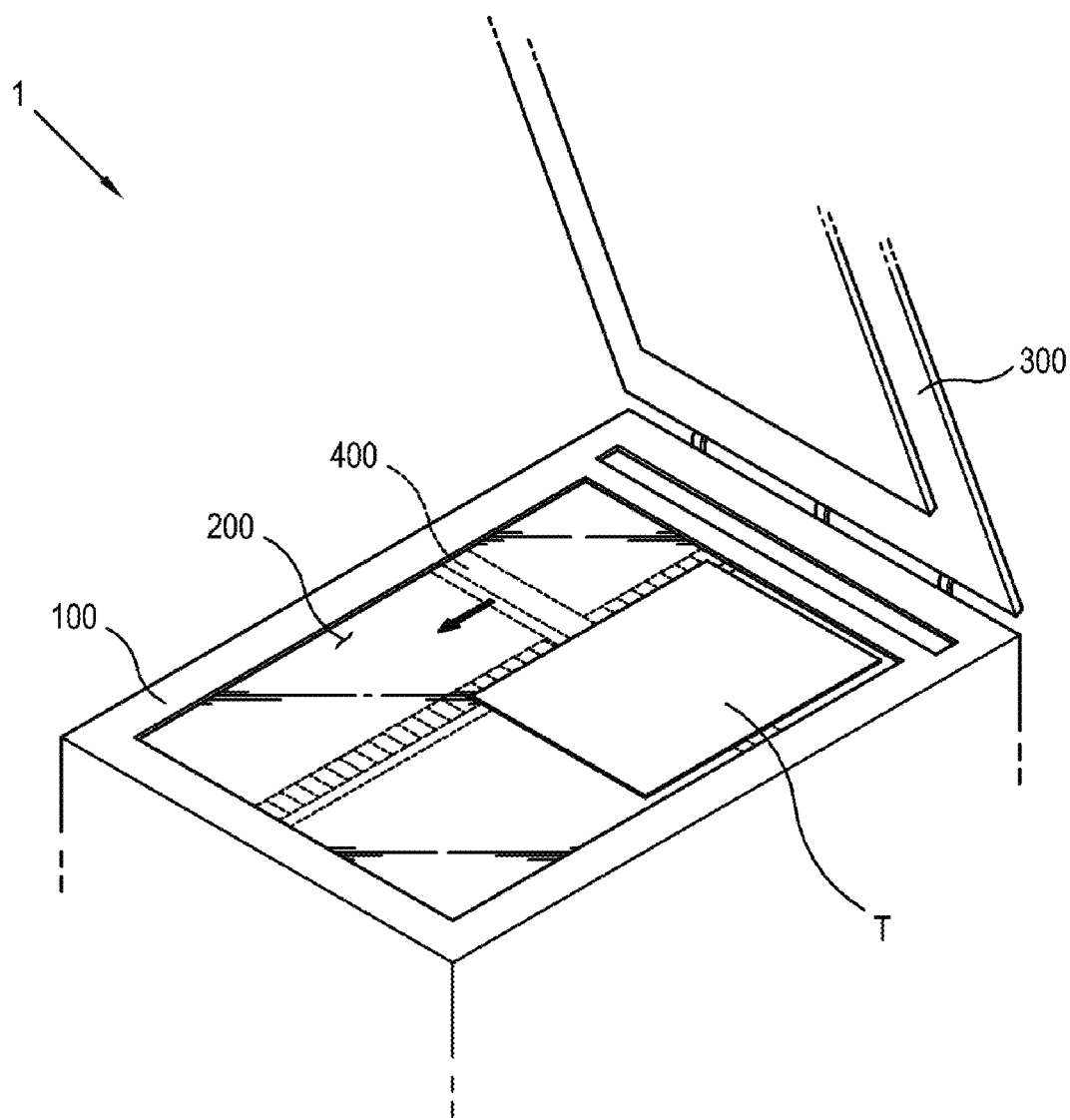
FIG. 1 is a perspective view illustrating an image processing apparatus according to an exemplary embodiment of the present general inventive concept.

Reference will now be made in detail to exemplary embodiments of the present general inventive concept, examples of which are illustrated in the accompanying drawings, wherein like reference numerals refer to the like elements throughout. The embodiments are described below in order to explain the present general inventive concept by referring to the figures. The present general inventive concept may be embodied in various forms without being limited to the embodiments set forth herein.

Figure 2:
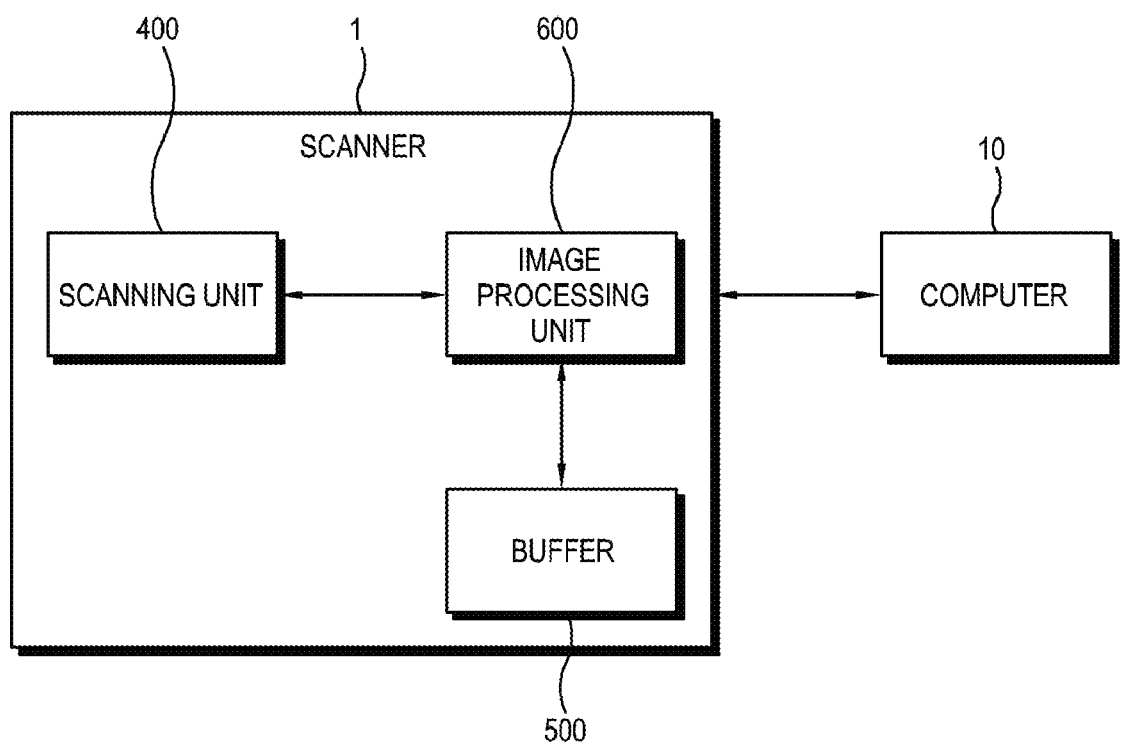
FIG. 2 is a block diagram illustrating the image processing apparatus of FIG. 1.

FIG. 1 is a perspective view illustrating an image processing apparatus according to an exemplary embodiment of the present general inventive concept, and FIG. 2 is a block diagram illustrating the image processing apparatus of FIG. 1. In this embodiment, the image processing apparatus is a scanner 1, but the image processing apparatus is of course not limited to such a device. For example, the image processing apparatus may be represented by a general apparatus such as a multifunction peripheral (not shown) which can read and process an image, or any of a plurality of other devices which perform similar functions.

As shown in FIGS. 1 and 2, a scanner 1 according to an exemplary embodiment of the present general inventive concept may create a scan image by scanning an object T, apply a correction process to the scan image by one or more various methods, and transmit the processed final scan image to a computer 10. The computer 10 may store the final scan image received from the scanner 1 so that a user can access the final scan image. The computer 10 may transmit a control signal to the scanner 1 in order to control operation of the scanner 1 according to a user's control.

In this embodiment, the scanner 1 includes the following elements, but is not limited thereto. The scanner 1 includes a scanning unit 400 to create a scan image by scanning an object T and output the scan image, and an image processing unit 600 to apply a correction process to the scan image.

Further, the scanner 1 includes a casing 100 forming an outer appearance, a transparent flat plate 200 provided at an upper side of the casing 100, a cover 300 to cover and uncover the transparent flat plate 200, and a buffer 500 to temporarily store the scan image from the scanning unit 400, edge pixel and boundary candidate information (to be described later) formed by the also included image processing unit 600, and so on. The scanner 1 may further include an automatic feed unit (not illustrated) to feed the object, such as a document, for the scanning unit 400 to scan the object, and for the image processing unit 600 to output a scan image. Such an automatic feed unit is well-known, and a detailed description thereof will be omitted.

According to the present embodiment, if the scanner 1 is affected by external incident light while scanning an object T and outputting a scan image, the scanner 1 detects a non-image area due to the external incident light from the scan image on the basis of a pixel-value distribution pattern formed differently according to variation in an incident angle of the external light. Further, the scanner 1 applies the correction process to the scan image in consideration of such a non-image area. Thus, it is possible to remove the non-image area from the scan image and extracts an image area with a proper boundary corresponding to an object T from the scan image.

Here, the image area indicates an area scanned corresponding to an object within the scan image, i.e., an area that a user wants to be scanned.

As previously discussed, the non-image area indicates an area scanned that does not correspond to the object T. In this embodiment, the non-image area may include a first non-image area formed regardless of external incident light, and a second non-image area formed by external incident light. The first non-image area may simply scan as black in a read or scanned image, but the second non-image area may have various patterns according to the incident angles of the external light. It is possible that the first non-image area can be formed by the light emitted from the scanning unit 600 and reflected by an element other than the scanned object. The terms "first non-image area" and "second non-image area" will be used with the same meanings as the above in the following descriptions.

The non-image area may have one or more characteristics that are different from a characteristic of the image area.

Hereinafter, the sub elements of the scanner 1 will be described in more detail.

As illustrated in FIG. 1, the transparent flat plate 200 is provided at a top side of the casing 100, and an object T is loaded or placed on the transparent flat plate 200. At this time, the object T is placed on the transparent flat plate 200 so that its surface to be read faces the transparent flat plate 200, and thus the scanning unit 400 can emit a light beam under the transparent flat plate 200 in order to scan the object T. To prevent a scanning error due to distortion while the light beam passes through the transparent flat plate 200, the transparent flat plate 200 has a high transparency.

The cover 300 may cover at least a portion of the top side of the casing 100 as well as the transparent flat plate 200 and thus prevents the light beam emitted from the scanning unit 400 from being emitted from the scanner 1 further than the cover 300, thereby contributing to the scanning of an object T. The cover 300 may have a bottom surface, i.e., a surface facing the transparent flat plate 200, which reflectively returns the light beam from the scanning unit 400 to the scanning unit 400.

The bottom surface of the cover 300 may be white to effectively reflect the light beam from the scanning unit 400, but the color of the rear surface is not limited thereto. For this reason, the non-image area of the scan image, scanned when the cover 300 is closed, shows white in a read image.

The scanning unit 400 is provided under the transparent flat plate 200 inside the casing 100, and is movable along the underside of the transparent flat plate 200. The scanning unit 400 moves while projecting the light beam upon an object T placed on the transparent flat plate 200 and receiving the projected light beam, and thus scans an image of the object T.

As illustrated in FIG. 2, the scanning unit 300 scans the object T and outputs a scan image to the image processing unit 600. The scan image may include a plurality of pixels which each have a pixel value and are arranged in rows and columns.

The image processing unit 600 may detect the first non-image area and the second non-image area from the scan image output by the scanning unit 400, and performs the correction process with regard to the scan image in consideration of the non-image area. In more detail, the image processing unit 600 performs the following operations with respect to the scan image.

At the first operation, the image processing unit 600 may detect the edge pixels among the pixels of the scan image on the basis of gray level patterns of the pixels constituting the scan image.

At the second operation, the image processing unit 600 may detect the first non-image area, which is formed regardless of the external incident light, and the second non-image area, which is formed by the external incident light within the scan image on the basis of a preset pixel-value distribution pattern of the scan image. Here, the pixel-value distribution pattern varies depending on the incident angle of the external light.

At the third operation, the image processing unit 600 may divide the scan image into a plurality of areas on the basis of the distribution of the edge pixels detected at the first operation, and removes the non-image area detected at the second operation from the divided areas, thereby extracting the proper image area and the boundary of the proper image area from the scan image.

Below, each operation performed in the image processing unit 600 will be described in more detail.

In the first operation, the image processing unit 600 may determine whether a certain pixel is significantly different in a gray level than neighboring pixels with respect to each pixel of the scan image. That is, a gray level of a pixel to be determined is compared with the gray levels of neighboring pixels, and this pixel is determined as an edge pixel if the difference in the gray level therebetween is equal to or higher than a preset value.

Various methods may be used for detecting the edge pixel. For example, a mask using a differential operator of Sobel, Prewitt, Robert, Laplacian or the like may be applied so that a gradient of a differential value corresponding to each pixel can be obtained with respect to horizontal and vertical directions. According to whether the gradient is a preset value or higher, it is possible to determine whether a pixel is an edge pixel or not. However, the present general inventive concept is not limited to the foregoing methods, and other methods may be used herein.

In the second operation, the image processing unit 600 may detect the non-image area within the scan image. As described above, the non-image area may include the first non-image area and the second non-image area.

In the case of the first non-image area, the pixels scan as substantially black, and there is no edge pixel or significantly few edge pixels equal to or less than a predetermined number. The image processing unit 600 may determine this scan area, which satisfies this condition, as the first non-image area.

Further, as previously described, the second non-image area is an area affected by the external incident light, of which the pixel-value distribution pattern shown in the scan image varies depending on the incident angles of the external light. On the basis of such a pixel-value distribution pattern, the image processing unit 600 can determine the second non-image area.

In the third operation, the image processing unit 600 may designate a plurality of boundary candidates corresponding to the edge pixels on the basis of the distribution pattern of the edge pixels. For example, if the number of edge pixels distributed according to row or columns is equal to or larger than a predetermined value, the pixel lines defined by the distributed edge pixels may be designated as the boundary candidates. Also, if the number of successive edge pixels adjacent to each other along a predetermined direction is equal to or larger than a predetermined value, these successive edge pixels may be designated as the boundary candidates. Of course various designation methods may be used, either alone or in combination, and the methods discussed herein do not limit the spirit of the present general inventive concept.

After the boundary candidates are designated, the image processing unit 600 may divide the scan image on the basis of the boundary candidates. The image processing unit 600 may remove the non-image area from the divided areas, thereby extracting the proper image area and its boundary from the scan image.

Below, an exemplary method of determining the boundary of the image area from the scan image in the scanner 1 according to an embodiment of the present general inventive concept will be described with reference to FIGS. 3 through 8.

Figure 3:
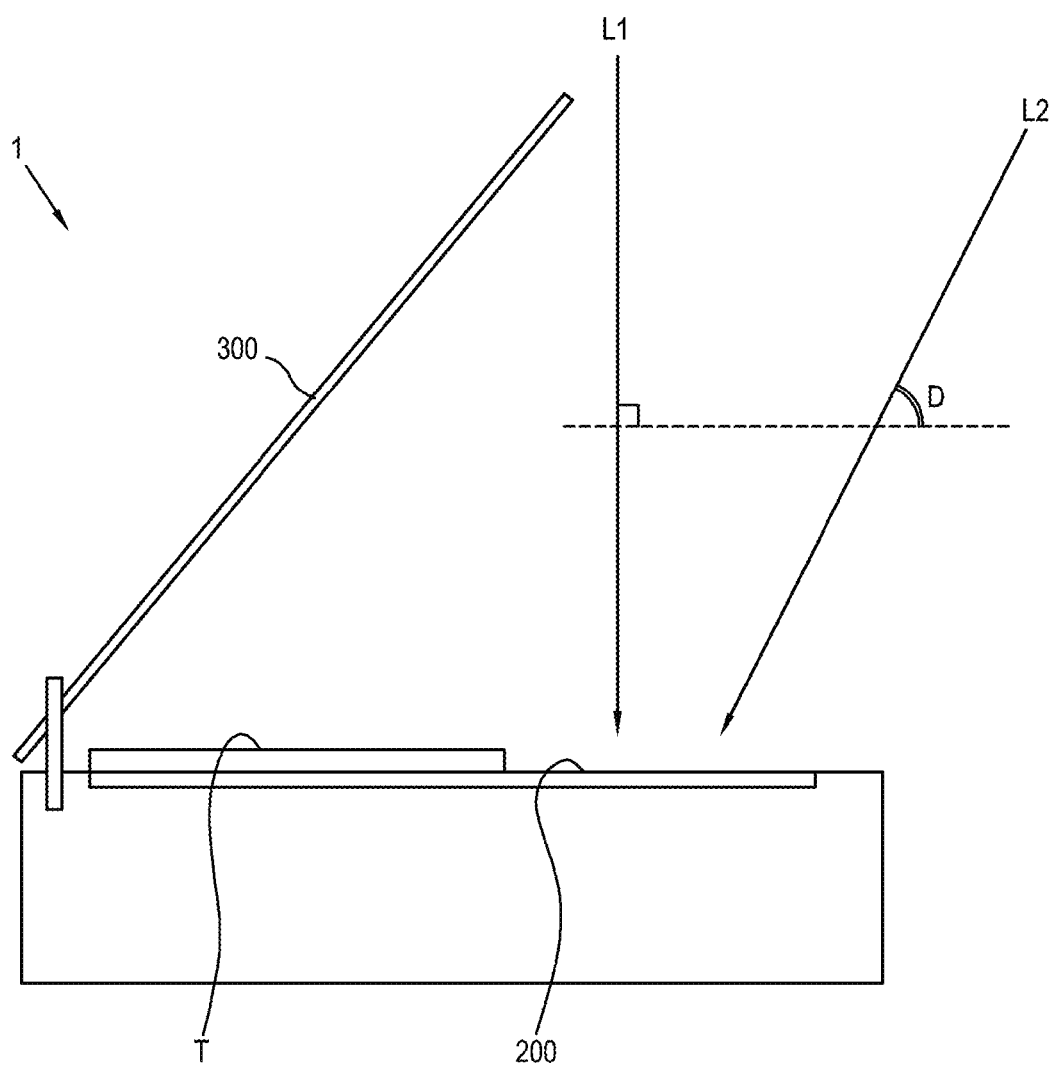
FIG. 3 illustrates an input pattern of external incident light in the image processing apparatus of FIG. 1 when a cover is open.

FIG. 3 illustrates an incident pattern of external light L1 and L2 when the cover 300 of the image processing apparatus 1 is open.

As illustrated in FIG. 3, if the scanning is performed while the cover 300 is open, external light L1 is perpendicularly incident on the transparent flat plate 200, that is, at an angle of 90 degrees to the surface of the transparent flat plate 200 or a moving direction of the scanning unit 400, and external light L2 is incident at an angle D less than 90 degrees to the surface of the transparent flat plate 200.

In the case of the external light L1, the scan image shows a white long column pattern on a black background. In the case of the external light L2, the scan image shows a scattered pixel pattern with various colors and/or shades. The image processing unit 600 may determine whether a scan area is affected by the external light L1 or the external light L2 on the basis of each pattern. Below, each pattern will be described in detail.

Figure 4:
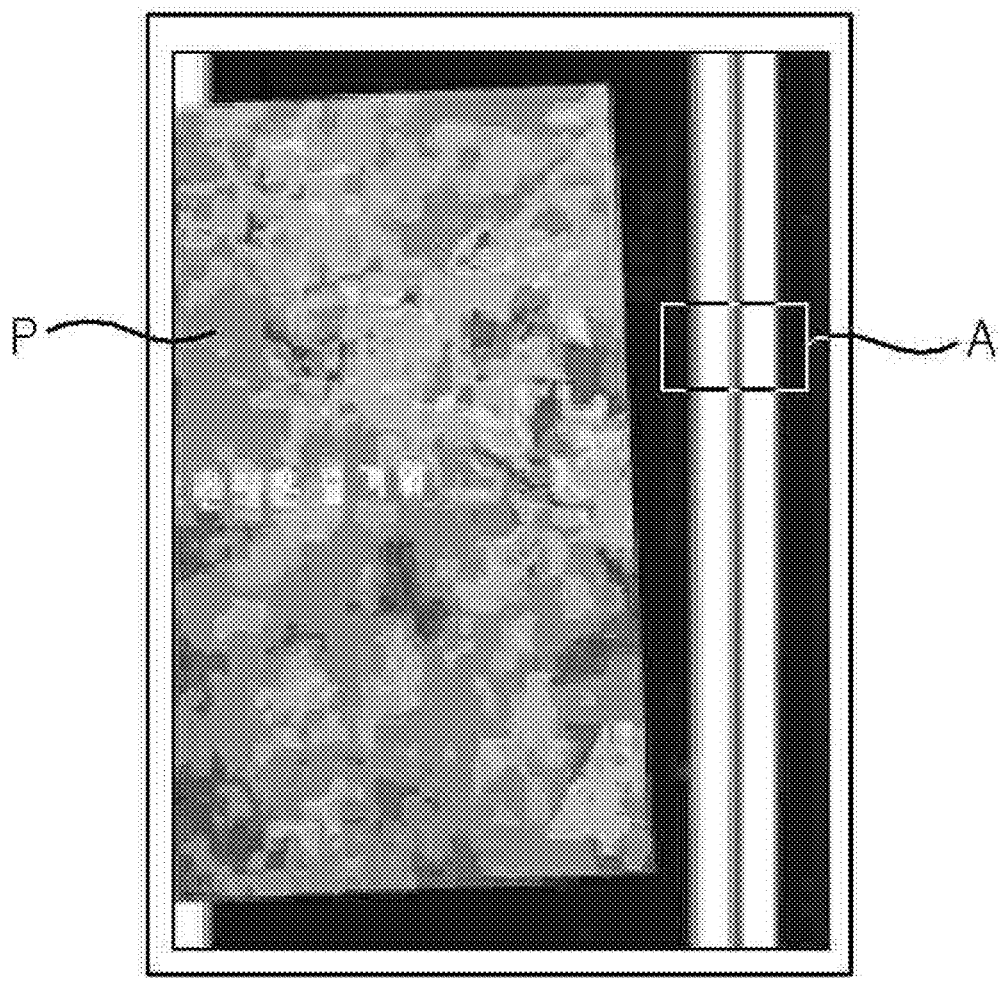
FIG. 4 illustrates an image scanned by a scanning unit in the image processing apparatus of FIG. 1.

FIG. 4 illustrates an image scanned by the scanning unit 400.

As illustrated in FIG. 4, an image obtained by scanning an object T with the scanning unit 400 includes an image area P corresponding to the object T and an additional non-image area A. Here, if the scanning is performed while the cover 300 is open, there are illustrated both the first non-image area, which is formed regardless of the external incident light, and the second non-image area, which is formed due to the external incident light.

FIG. 4 illustrates the image area P and also a long white column pattern on a black background. The long white column pattern indicates a scan area affected by the external light L1 incident at an angle of 90 degrees.

Figure 5:
FIG. 5 illustrates edge pixels detected from the scanned image of FIG. 4.

FIG. 5 illustrates edge pixels detected from the scan image of FIG. 4.

Referring to FIG. 5, the image processing unit 600 may perform the first operation as described above, and detects the edge pixels among the plurality of pixels in the scan image. In FIG. 5, the edge pixels are represented as black. In the comparison of FIGS. 4 and 5, the edge pixels are scattered even within the image area P, and a boundary line between the black background and the long white column pattern forms a long line based on the edge pixels.

Then, the image processing unit 600 may perform the second operation to detect the non-image area in the scan image. The image processing unit 600 detects the first non-image area and the second non-image area within the scan image, in which the second non-image area is detected on the basis of the pixel-value distribution pattern, which is varied depending on the incident angle of the external light.

Figure 6:
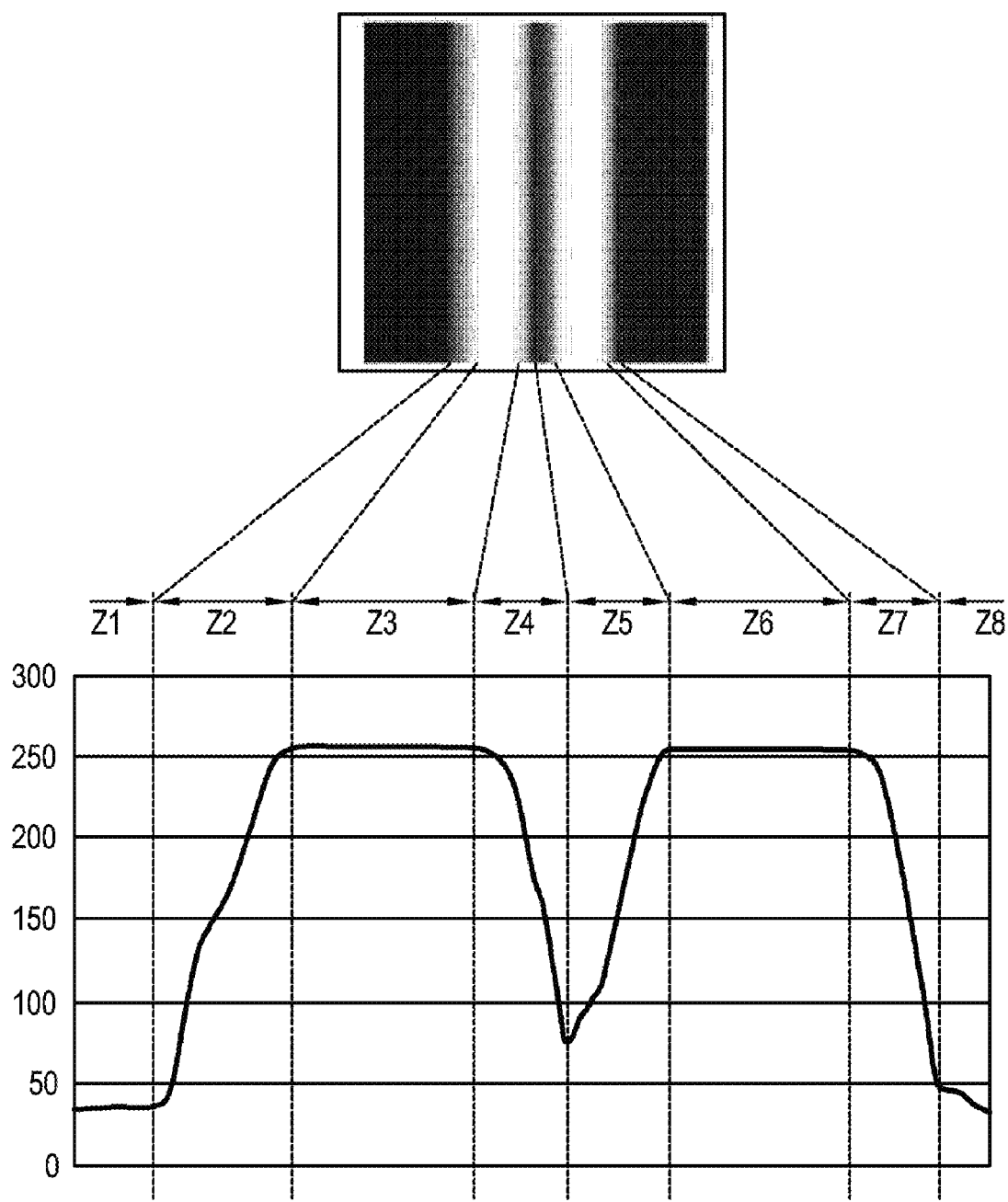
FIG. 6 is a graph illustrating change in a brightness level according to row positions of the 'A'-area of FIG. 4.

FIG. 6 is a graph illustrating a brightness level in the 'A':-area of FIG. 4.

In FIG. 6, an upper image is an enlargement of a portion of the 'A'-area of FIG. 4, and a lower graph shows the brightness level according to row positions of the A-area. In the graph of FIG. 6, a horizontal axis indicates the row positions of the 'A'-area, and a vertical axis indicates the brightness level. In the upper image of FIG. 6, a black area corresponds to a pixel area having a relatively low brightness level, and a white area corresponds to a pixel area having a relatively high brightness level.

In a first half of the graph, the pixels according to the row positions of the 'A'-area are arranged in a section Z1 corresponding to a substantially black pixel area, a section Z2 in which pixel values increase gradually, a section Z3 corresponding to a substantially white pixel area, and a section Z4 in which pixel values decrease gradually.

If the pixel value distribution pattern according to the row positions is repeated along the column, the image processing unit 600 determines this pattern as a scan area affected by the external light L1 incident at an angle of 90 degrees. As shown in a right portion of the scan image in FIG. 4, this scan area is represented as a long white column line on the black background.

Further, the section Z4 is bordered by a section Z5 in which pixel values increase gradually, a section Z6 corresponding to a substantially white pixel area, a section Z7 in which pixel values decrease gradually, and a section Z8 corresponding to a substantially black pixel area. That is, since the sections Z5 through Z8 have patterns substantially symmetrical to the sections Z1 through Z4, this pattern is also regarded as being affected by the external light L1 incident at an angle of 90 degrees.

Although it is not shown, if a hue dispersion is more than a predetermined value and there is no edge pixel with respect to an area of the scan image, the image processing unit 600 determines this area as being affected by the external light L2 incident at an angle less than 90 degrees.

Here, various sets may be used in determining the hue dispersion. For example, a plurality of hue groups may be set, and pixels in a certain area may be grouped by the hue components according to a hue value that the respective pixels have. In the case in which the number of groups of which each hue component is equal to or higher than a first set value is equal to or larger than a second set value, it may be determined that the hue dispersion in an area concerned is higher than another predetermined value. If there is no edge pixel in this area, the image processing unit 600 regards this area as it is affected by the external light incident at an angle less than 90 degrees.

On the basis of the foregoing preset pattern, the image processing unit 600 performs the second operation to detect the second non-image area in the scan image.

Figure 7:
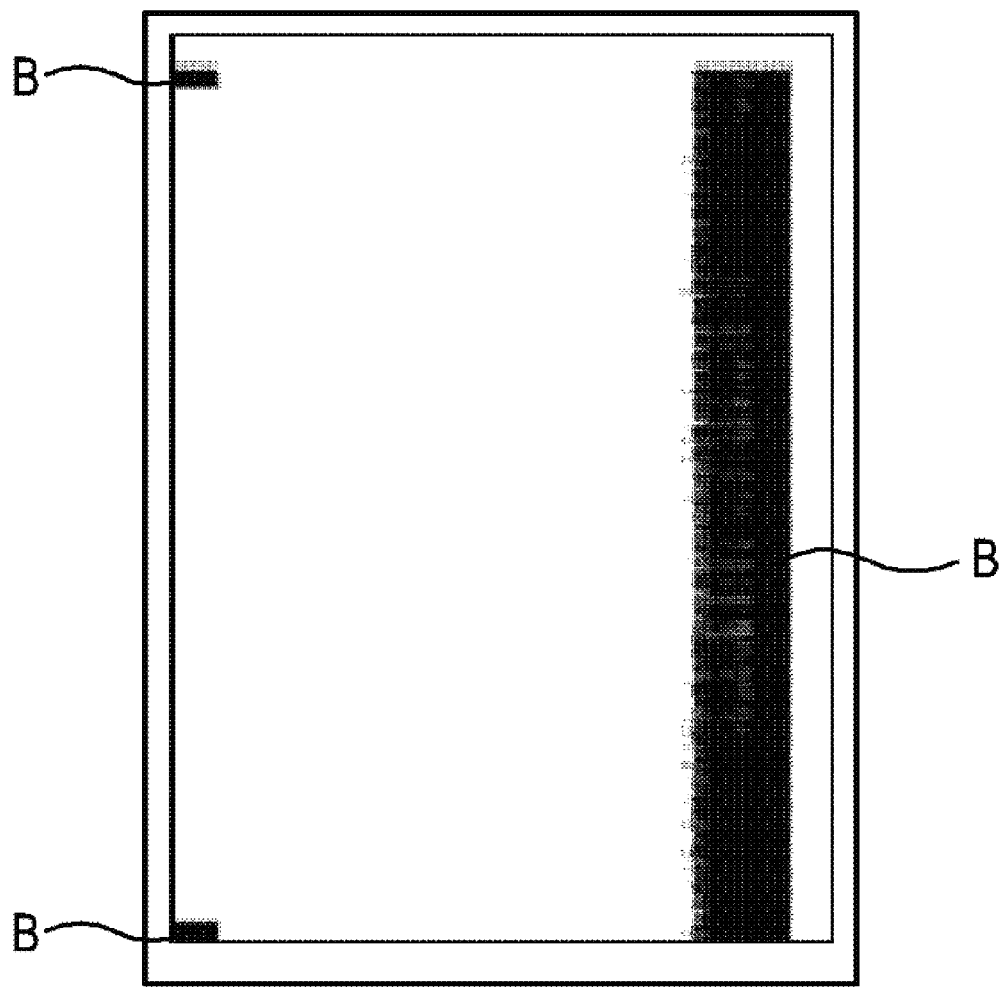
FIG. 7 illustrates a non-image area caused by external incident light, which is detected from the scanned image of FIG. 4.

FIG. 7 illustrates a scan area affected by the external incident light in the scan image of FIG. 4.

As shown in FIG. 7, the image processing unit 600 detects an area caused by the external light within the scan image, specifically, the second non-image area affected by the external light L1 incident at an angle of 90 degrees. In FIG. 7, the second non-image area is the 'B'-area represented as black, and the other areas are represented as white.

Then, the image processing unit 600 may perform the third operation to designate the boundary candidates and remove the non-image area, thereby defining the boundary of the image area.

Figure 8:
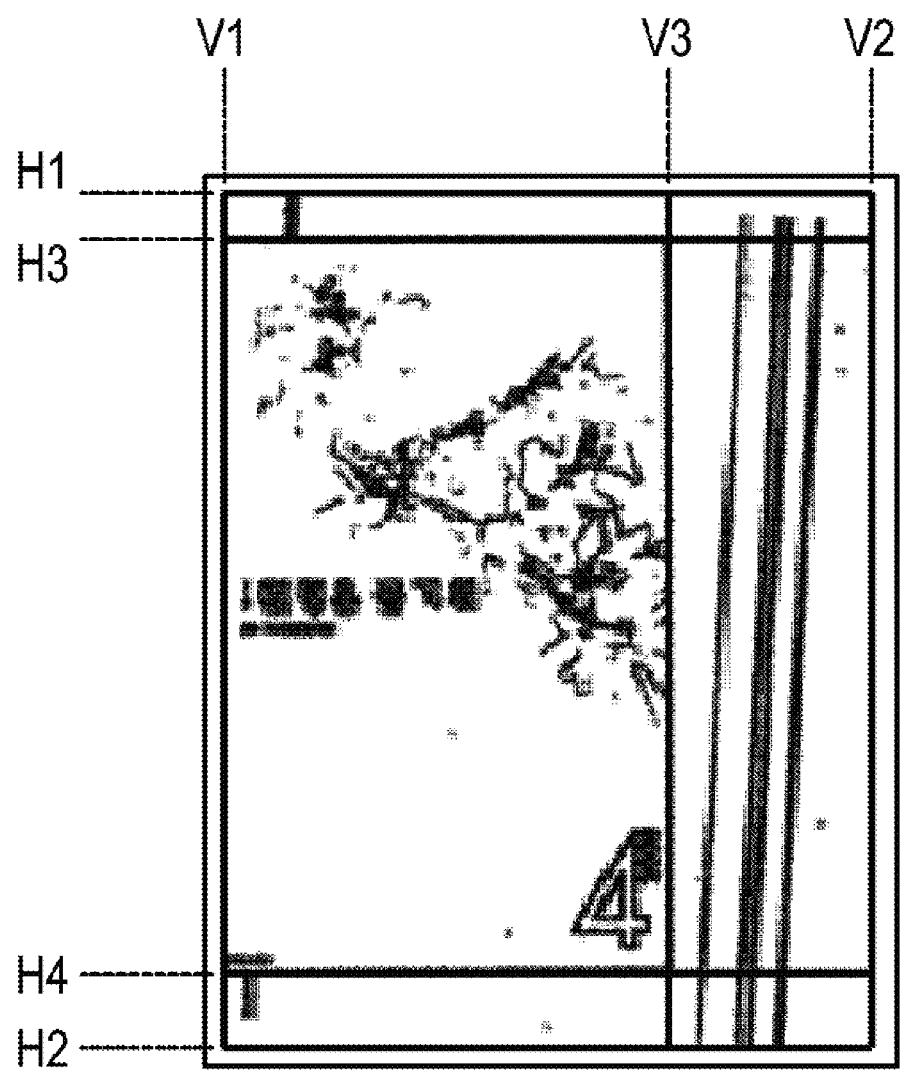
FIG. 8 illustrates the scanned image of FIG. 4 divided by boundary candidates.

FIG. 8 illustrates the scanned image of FIG. 4 divided by boundary candidates.

As shown in FIG. 8, the image processing unit 600 sets up the boundary candidates H3, H4 and V3 on the basis of the edge pixel distribution detected as shown in FIG. 5. For example, a method of designating the boundary candidates H3, H4 and V3 may include setting up row or column pixel lines as the boundary candidates H3, H4 and V3 in response to the number of edge pixels forming the pixel line being equal to or larger than the preset value, but the methods are of course not limited thereto.

When the boundary candidates H3, H4 and V3 are designated, the image processing unit 600 adjusts a gradient of the scan image so that the boundary candidates H3, H4 and V3 can be parallel with the row and column directions, respectively, relative to the transparent flat plate 200. Then, the outmost boundary of the scan image whose gradient is adjusted is designated as additional boundary candidates H1, H2, V1 and V2.

After designating the boundary candidates H1, H2, H3, H4, V1, V2 and V3, the image processing unit 600 may determine whether each respective scan area of the scan image divided by the boundary candidates H1, H2, H3, H4, V1, V2 and V3 is the non-image area. Here, the determination may be sequentially performed in column or row directions.

Referring to the example of FIG. 8, in the column direction of the scan image, the image processing unit 600 may determine that the second non-image area exists between the boundary candidates H1 and H3, the second non-image area and the scan area which does not satisfy the conditions of the non-image area exist between the boundary candidates H3 and H4, and the second non-image area exists between the boundary candidates H4 and H2. Accordingly, the image processing unit 600 may remove the areas H1-H3 and H4-H2 and maintains the area H3-H4.

Here, the scan area which doesn't satisfy the conditions of the non-image area indicates an area that does not satisfy the above-described conditions of the non-image area but does include image information expected as an image area.

Then, in the row direction of the maintained area H3-H4, the image processing unit 600 may determine that the scan area which does not satisfy the conditions of the non-image area exists between the boundary candidates V1 and V3, and the second non-image area exists between the boundary candidates V3 and V2. Accordingly, the image processing unit 600 may maintain the area V1-V3 and remove the area V3-V2 within the area H3-H4.

As a result, the image processing unit 600 defines H3-H4 and V1-V3 as the real boundaries of the image area P among the designated boundary candidates H1, H2, H3, H4, V1, V2 and V3. Thus, the area surrounded by the real boundaries may be defined as the image area P.

Accordingly, the image processing unit 600 may define the image area and its boundary through the foregoing processes, so that the non-image area affected by the external incident light or the like can be removed from the scan image, thereby extracting an image area corresponding to the scanned object.

Figure 9:
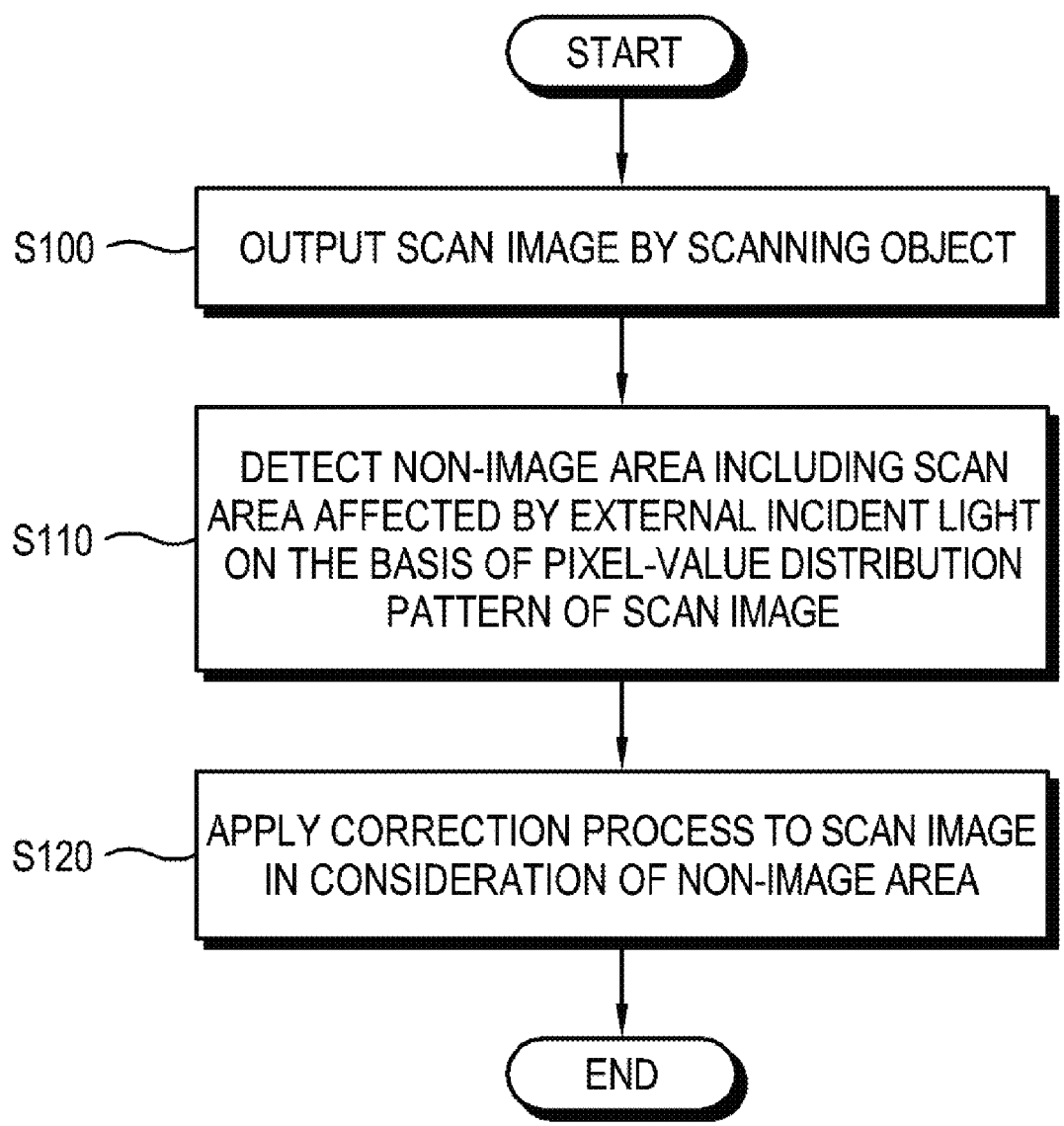
FIG. 9 is a control flowchart that schematically illustrates a correction process considering the non-image area of the scanned image in the image processing apparatus of FIG. 1.

With this configuration, a method of determining and removing a non-image area from a scan image in the scanner 1 according to an exemplary embodiment of the present general inventive concept will be described with reference to FIG. 9. FIG. 9 is a control flowchart that schematically illustrates this method.

As illustrated in FIG. 9, at operation S100, the scanning unit 400 outputs a scan image by scanning an object T.

At operation S110, the image processing unit 600 detects the non-image area including the scan area affected by the external incident light from the scan image on the basis of the pixel value distribution pattern of the output scan image.

At operation S120, the image processing unit 600 applies the correction process to the scan image in consideration of the detected non-image area.

Figure 10:
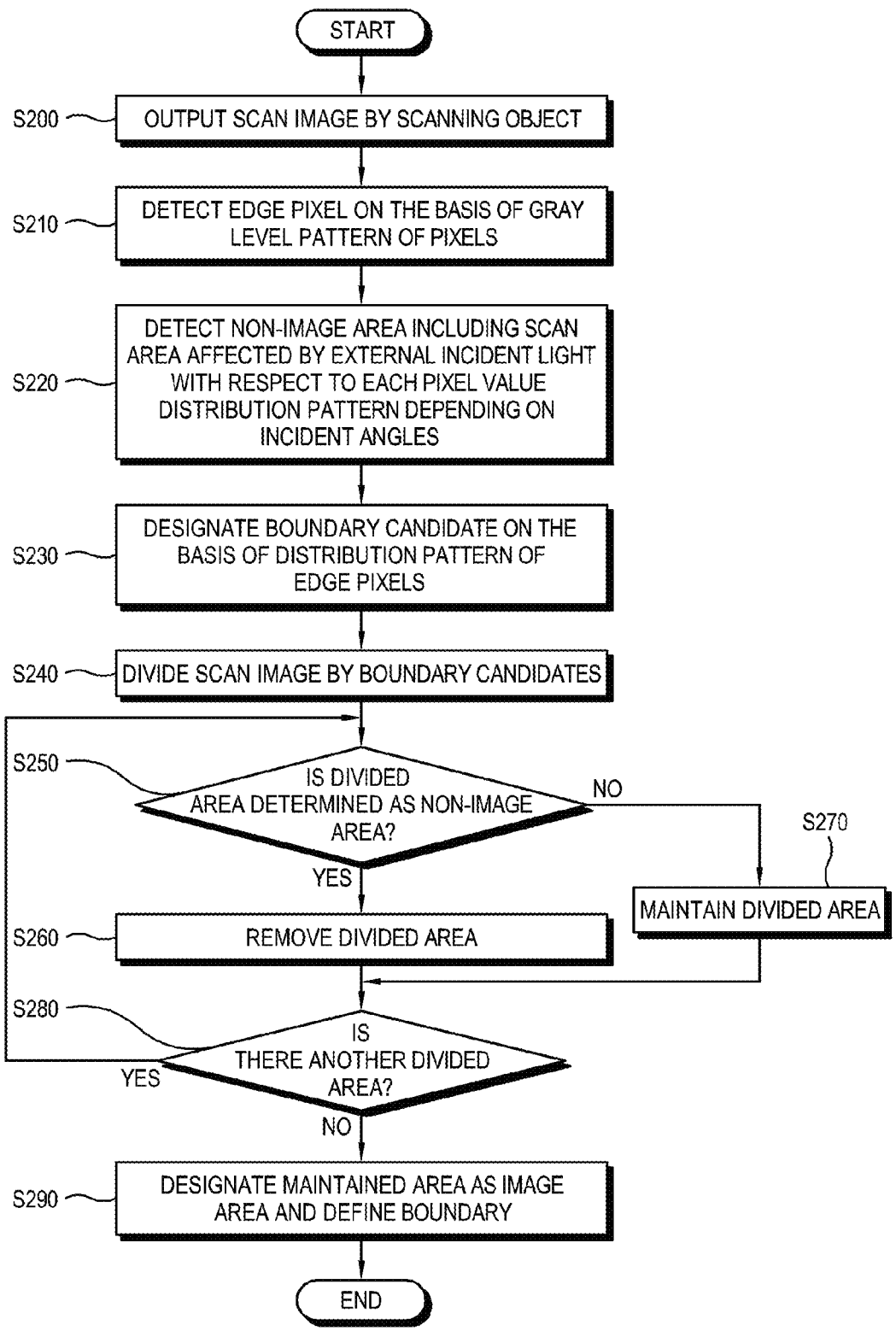
FIG. 10 is a control flowchart that illustrates a process of determining a boundary of an image area by removing the non-image area from the scanned image in the image processing apparatus of FIG. 1.

Below, a method of removing the non-image area from the scan image and determining the boundary of the image area in the scanner 1 according to an exemplary embodiment of the present general inventive concept will be described with reference to FIG. 10. FIG. 10 is a control flowchart that schematically illustrates this method.

As shown in FIG. 10, at operation S200, the scanning unit 400 outputs a scan image by scanning an object T.

At operation S210, the image processing unit 600 detects the edge pixels on the basis of the gray level pattern of the pixels from the scan image.

At operation S220, the image processing unit 600 detects the non-image area including the scan area affected by the external incident light with respect to each pixel-value distribution pattern, which varies depending on the incident angle of the scan image.

At operation S230, the image processing unit 600 designates the boundary candidates on the basis of the edge-pixel distribution pattern. At operation S240, the image processing unit 600 divides the scan image into a plurality of areas according to the boundary candidates.

At operation S250, the image processing unit 600 determines whether the divided area is a non-image area. At operation S260, the image processing unit 600 removes an area if the area is determined to be the non-image area. At operation S270, the image processing unit 600 does not remove an area if the area is not determined to be the non-image area. At operation S280, the image processing unit 600 determines whether there is another divided area, and repeats the foregoing process with regard to any such divided area.

At operation S290, the image processing unit 600 designates an area that has not been removed, but rather has been maintained in the scan image as an image area, and defines a boundary corresponding to the image area.

With this method, even though the external light is incident during the scanning due to the cover 300 being opened, the area affected by the external incident light is removed from the scan image, and thus an image area and its boundary are defined corresponding to a scanned object.

In the method as shown in FIG. 10, the method of determining an area of a scan image divided by boundary candidates as a non-image area may include various methods within the spirit of the present general inventive concept. Below, an exemplary method of determining whether or not a predetermined divided scan area is the non-image area will be described with reference to FIG. 11.

Figure 11:
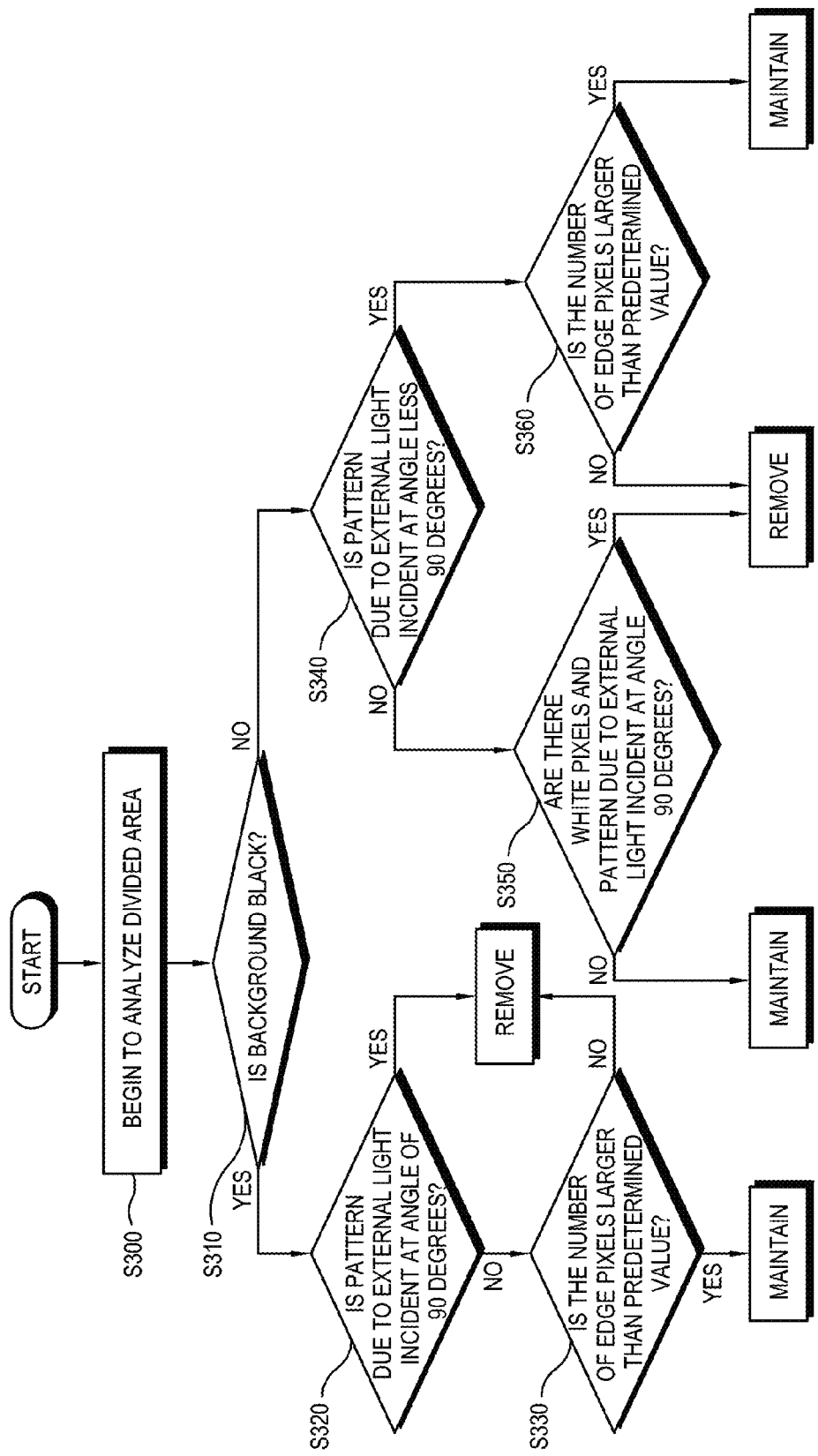
FIG. 11 is a control flowchart that illustrates a process of determining whether an area divided by the boundary candidate is the non-image area in the image processing apparatus of FIG. 1.

FIG. 11 is a control flowchart that illustrates the foregoing method, in which the operations S250 to S270 of FIG. 10 are illustrated in more detail.

Referring to FIG. 11, at operation S300 the image processing unit 600 begins to analyze one target area among the plurality of areas divided by the boundary candidates.

At operation S310, the image processing unit 600 determines whether the target area has a substantially black background. Here, various methods may be used in determining whether the background is black. For example, it is possible to determine whether the background is black on the basis of how many pixels are black among the total number of pixels in the target area, or on the basis of how many black pixels are adjacent to each other.

If it is determined that a target area has a black background, the image processing unit 600 determines whether the target area has a pattern formed by the external light incident at an angle of 90 degrees at operation S320, and removes the target area in response to this pattern existing in the area.

If it is determined that the target area has no pattern formed by the external light incident at an angle of 90 degrees, the image processing unit 600 determines whether the number of edge pixels is equal to or larger than a predetermined value at operation S330. This is to check whether information from the scanned object exists in the target area.

The image processing unit 600 maintains the target area in response to determining that the number of edge pixels is equal to or higher than the predetermined value. On the other hand, if it is determined that there is no edge pixel or the number of edge pixels is smaller than the predetermined value, the image processing unit 600 removes the target area.

In the operation S310 of determining whether the background of the target area is substantially black or not, if the background of the target area is not black, the image processing unit 600 determines whether the target area has a pattern formed by the external light incident at an angle less than 90 degrees at operation S340.

If it is determined that the target area has no pattern formed by the external light incident at an angle less than 90 degrees, the image processing unit 600 determines whether the target area has a substantially white pixel or a pattern formed by the external light incident at an angle of 90 degrees at operation S350, maintains the target area when this pattern does not exist, and removes the target area when this pattern does exist. One reason to determine whether the white pixel exists is because the pattern formed by the external light incident at an angle of 90 degrees may be represented as a white column line on the black background.

If it is determined that the target area has the pattern due to the external light incident at an angle less than 90 degrees as operation S340, the image processing unit 600 determines whether the number of edge pixels in the target area is equal to or larger than a predetermined value at operation S360. The image processing unit 600 maintains the target area in response to determining that the number of edge pixels is equal to or higher than the predetermined value. On the other hand, if it is determined that there is no edge pixel or the number of edge pixels is smaller than the predetermined value, the image processing unit 600 removes the target area.

Here, the operation S360 may be performed in the operation S340 since the pattern formed by the external light incident at an angle less than 90 degrees corresponds to the case in which the hue dispersion is equal to or higher than a predetermined first set value, there is no edge pixel, or the number of pixels is smaller than or equal to a predetermined second set value. Alternatively, only whether the hue dispersion is equal to or higher than the first set value may be determined in the operation S340.

With this method, it is determined whether each divided area is a non-image area, so that any area determined as a non-image area can be removed while maintaining the image area, thereby obtaining an image area corresponding to an object T.

Figure 12:
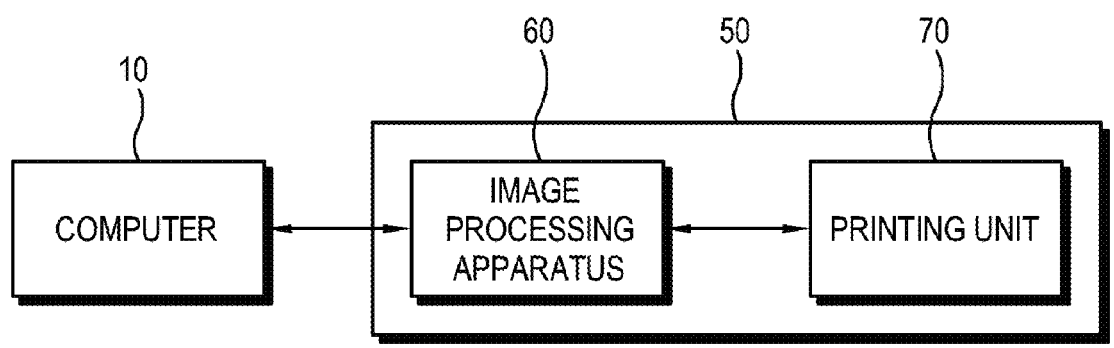
FIG. 12 is a block diagram illustrating an image forming apparatus with the image processing apparatus according to an exemplary embodiment of the present general inventive concept.

Meanwhile, FIG. 12 is a block diagram of an image forming apparatus 50 according to an exemplary embodiment of the present invention. In this embodiment, the image forming apparatus 50, represented here by a multifunction peripheral, includes an image processing apparatus 60 to process and output an image corresponding to an object T, and a printing unit 70 to print and visualize the image output from the image processing apparatus 60 on a print medium.

Here, the image processing apparatus 60 may have the same configuration as the previously discussed image processing apparatus, and therefore detailed descriptions thereof will be omitted. The image forming apparatus 50 may be connected to a computer 10 allowing data communication therebetween, and the image processing apparatus 60 may transmit an image processed as described above to the computer 10, or output the processed image to the printing unit 70.

The printing unit 70 prints an image output from the image processing apparatus 60 on a print medium. The printing unit 70 can have configurations without limitation, and may use a developer or ink to visualize the image on the print medium.

As apparent from the above description, a non-image area caused by external incident light may be removed from an image scanned by a scanning unit, so that a real boundary of an image area can be obtained in the scanned image, thereby deriving the image area corresponding to a scanned object. Thus, only an image corresponding to the object desired by a user is read, thereby reducing the size of image data. It is also possible to decrease the processing load, the amount of developer, etc., taken in forming the scanned image on a print medium.

Further, a non-image area of a scan image may be determined on the basis of a brightness pattern previously set according to an incident manner of external incident light, so that there is no need of configurations for determining whether a cover for covering an object when scanning the object is open or to what degree the cover is open. Accordingly, an image process is simplified. Also, a user does not need to manually designate the non-image area, thereby enhancing a user's convenience.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing method of an image processing apparatus, the method comprising:
    generating a scan image by scanning an object;
    detecting a non-image area affected by external incident light in the scan image according to a pixel-value distribution pattern varied depending on incident angles of the external incident light in response to the external incident light being present while scanning the object; and
    extracting an image area corresponding to the object by removing the non-image area from the scan image.

2. The method according to claim 1, further comprising detecting edge pixels of the scan image according to a gray level pattern of pixels in the scan image,
    wherein the extracting the image area corresponding to the object comprises dividing the scan image into a plurality of areas with respect to distribution of the detected edge pixels to remove the non-image area.

3. The method according to claim 2, wherein the detecting the non-image area comprises determining the non-image area affected by the external incident light according to the pixel-value distribution patterns formed by the external incident light at incident angles of 90 degrees and less than 90 degrees, respectively.

4. The method according to claim 3, wherein the determining the non-image area affected by the external incident light comprises determining that a scan area is formed by the external incident light at the incident angle of 90 degrees in response to the scan area having repetitive patterns along a column in which pixel values of plural pixels in a row section of the scan area transition from substantially black to white, have a successive white section and transition from white to a darker pixel value.

5. The method according to claim 3, wherein the determining the non-image area affected by the external incident light comprises determining that a scan area is formed by the external incident light at the incident angle less than 90 degrees in response to the scan area of the scan image having hue dispersion equal to or higher than a first predetermined value and no detected edge pixels or the number of edge pixels being smaller than or equal to a second predetermined value.

6. The method according to claim 2, wherein the extracting the image area corresponding to the object comprises:
    designating a boundary candidate according to a distribution pattern of the edge pixels; and
    defining a boundary of the image area by determining the non-image area among areas of the scan image divided by the boundary candidate.

7. The method according to claim 6, wherein the non-image area comprises:
    a first non-image area formed regardless of the external incident light and the object; and
    a second non-image area formed by the external incident light,
    wherein the defining the boundary of the image area comprises selectively removing or maintaining the divided areas by determining whether each of the divided areas is the first non-image area or the second non-image area.

8. The method according to claim 7, wherein the selectively removing or maintaining the divided areas comprises:
    determining whether occupation of black pixels in each of the divided areas is equal to or higher than a first predetermined value; and
    determining whether each of the divided areas has a pixel-value distribution pattern due to the external incident light incident at an angle of 90 degrees or less than 90 degrees according to results of the determining of the occupation of black pixels.

9. The method according to claim 8, wherein the selectively removing or maintaining the divided areas comprises:
    determining whether the number of edge pixels is equal to or larger than a second predetermined value in response to there being a pixel-value distribution pattern affected by the external incident light; and
    maintaining any of the divided areas in which the number of edge pixels is equal to or larger than the second predetermined value, and removing any of the divided areas in which the number of edge pixels is smaller than the second predetermined value.

10. The method according to claim 8, wherein the determining whether each of the divided areas has the pixel-value distribution pattern due to the external incident light comprises:
    determining the pixel-value distribution pattern to be due to the external incident light incident at an angle of 90 degrees in response to the occupation of black pixels being equal to or higher than the first predetermined value; and
    determining the pixel-value distribution pattern to be due to the external incident light incident at an angle less than 90 degrees in response to the occupation of black pixels being less than the first predetermined value.

11. The method according to claim 2, wherein the detecting the edge pixels of the scan image comprises determining that pixels among the plural pixels in the scan image are the edge pixels in response to a gray level difference between respective ones of the pixels and an adjacent pixel being equal to or higher than a predetermined value.

12. An image processing apparatus comprising:
a scanning unit to generate a scan image by scanning an object; and
an image processing unit to detect a non-image area affected by external incident light in the scan image according to a pixel-value distribution pattern varied depending on incident angles of the external incident light in response to the external incident light being present while scanning the object, and to extract an image area corresponding to the object by removing the non-image area from the scan image.

13. The image processing apparatus according to claim 12, wherein the image processing unit detects edge pixels of the scan image according to a gray level pattern of pixels in the scan image, and divides the scan image into a plurality of areas with respect to distribution of the detected edge pixels to remove the non-image area.

14. The image processing apparatus according to claim 13, wherein the image processing unit determines the non-image area affected by the external incident light according to the pixel-value distribution patterns formed by the external incident light at incident angles of 90 degrees and less than 90 degrees, respectively.

15. The image processing apparatus according to claim 14, wherein the image processing unit determines that a scan area is formed by the external incident light at the incident angle of 90 degrees in response to the scan area having repetitive patterns along a column in which pixel values of plural pixels in a row section of the scan area transition from substantially black to white, have a successive white section and transition from white to a darker pixel value.

16. The image processing apparatus according to claim 14, wherein the image processing unit determines that a scan area is formed by the external incident light at the incident angle less than 90 degrees in response to the scan area of the scan image having hue dispersion equal to or higher than a first predetermined value and no detected edge pixels or the number of edge pixels being smaller than or equal to a second predetermined value.

17. The image processing apparatus according to claim 13, wherein the image processing unit designates a boundary candidate according to a distribution pattern of the edge pixels; and defines a boundary of the image area by determining the non-image area among areas of the scan image divided by the boundary candidate.

18. The image processing apparatus according to claim 17, wherein the non-image area comprises:
a first non-image area formed regardless of the external incident light and the object; and
a second non-image area formed by the external incident light,
wherein the image processing unit selectively removes or maintains the divided areas by determining whether each of the divided areas is the first non-image area or the second non-image area.

19. The image processing apparatus according to claim 18, wherein the image processing unit determines whether occupation of black pixels in each of the divided areas is equal to or higher than a first predetermined value; and
determines whether each of the divided areas has a pixel-value distribution pattern due to the external incident light incident at an angle of 90 degrees or less than 90 degrees according to results of the determining of the occupation of black pixels.

20. The image processing apparatus according to claim 19, wherein the image processing unit determines whether the number of edge pixels is equal to or larger than a second predetermined value in response to there being a pixel-value distribution pattern affected by the external incident light; and
maintains any of the divided areas in which the number of edge pixels is equal to or larger than the second predetermined value, and removes any of the divided areas in which the number of edge pixels is smaller than the second predetermined value.

21. The image processing apparatus according to claim 19, wherein the image processing unit determines the pixel-value distribution pattern to be due to the external incident light incident at an angle of 90 degrees in response to the occupation of black pixels being equal to or higher than the first predetermined value; and
determines the pixel-value distribution pattern to be due to the external incident light incident at an angle less than 90 degrees in response to the occupation of black pixels being less than the first predetermined value.

22. The image processing apparatus according to claim 13, wherein the image processing unit determines that pixels among the plural pixels in the scan image are the edge pixels in response to a gray level difference between respective ones of the pixels and an adjacent pixel being equal to or higher than a predetermined value.

23. An image forming apparatus comprising:
an image processing apparatus including:
a scanning unit to generate a scan image by scanning an object, and
an image processing unit to detect a non-image area affected by external incident light in the scan image according to a pixel-value distribution pattern varied depending on incident angles of the external incident light in response to the external incident light being present while scanning the object, and to extract an image area corresponding to the object by removing the non-image area from the scan image; and
a printing unit which prints the image area corresponding to the object and received from the image processing apparatus on a print medium.

24. An image processing method of an image processing apparatus, the method comprising:
generating a scan image by scanning an object;
detecting a scan area formed differently according to an incident angle of external light while scanning the object, from the scan image; and
processing the scan image according to results of the detecting the scan area, wherein the detecting the scan area comprises determining the scan area affected by the external incident light according to pixel-value distribution patterns formed by the external incident light at incident angles of 90 degrees and less than 90 degrees, respectively.

25. The method according to claim 24 wherein the determining the scan area affected by the external incident light comprises determining that the scan area is formed by the external incident light at the incident angle of 90 degrees in response to the scan area having repetitive patterns along a column in which pixel values of plural pixels in a row section of the scan image transition from substantially black to white, have a successive white section and transition from white to a darker pixel value.

26. The method according to claim 24, further comprising detecting edge pixels of the scan image according to a gray level pattern of pixels in the output scan image.

27. The method according to claim 26, wherein the determining the scan area affected by the external incident light comprises determining that the scan area is formed by the external incident light at the incident angle less than 90 degrees in response to the scan area of the scan image having hue dispersion equal to or higher than a first predetermined value and no detected edge pixels or the number of edge pixels being smaller than or equal to a second predetermined value.

28. The method according to claim 26, wherein the detecting the edge pixels of the scan image comprises determining that pixels among the plural pixels in the scan image are the edge pixels in response to a gray level difference between respective ones of the pixels and an adjacent pixel being equal to or higher than a predetermined value.

29. The method according to claim 26, wherein the processing the scan image comprises:
dividing the scan image into a plurality of areas with respect to distribution of the detected edge pixels; and
extracting an image area corresponding to the object by removing the scan area affected by the external incident light among the divided areas.

30. The method according to claim 26, wherein the scan area comprises a first non-image area formed regardless of the external incident light and the object, and a second non-image area formed by the external incident light, and
the processing the scan image comprises:
dividing the scan image into a plurality of areas with respect to distribution of the detected edge pixels; and
selectively removing or maintaining each of the divided areas by determining whether each of the divided areas is the first non-image area or the second non-image area.

31. The method according to claim 30, wherein the selectively removing or maintaining each of the divided areas comprises:
determining whether occupation of black pixels in each of the divided areas is equal to or higher than a first predetermined value; and
determining whether each of the divided areas has a pixel-value distribution pattern due to the external incident light incident at an angle of 90 degrees or less than 90 degrees according to results of the determining of the occupation of black pixels.

32. The method according to claim 31, wherein the selectively removing or maintaining each of the divided areas comprises:
determining whether the number of edge pixels is equal to or larger than a second predetermined value in response to there being a pixel-value distribution pattern affected by the external incident light; and
maintaining any of the divided areas in which the number of edge pixels is equal to or larger than the second predetermined value, and removing any of the divided areas in which the number of edge pixels is smaller than the second predetermined value.

33. The method according to claim 31, wherein the determining whether each of the divided areas has the pixel-value distribution pattern due to the external incident light comprises:
determining the pixel-value distribution pattern to be due to the external incident light incident at an angle of 90 degrees in response to the occupation of black pixels being equal to or higher than the first predetermined value; and
determining the pixel-value distribution pattern to be due to the external incident light incident at an angle less than 90 degrees in response to the occupation of black pixels being less than the first predetermined value.

* * * * *